United States Patent Office 3,215,682
Patented Nov. 2, 1965

3,215,682
PROCESS AND CATALYST FOR PRODUCTION OF RUBBERY POLYMERS
Ralph C. Farrar and Floyd E. Naylor, Bartlesville, Okla., assignors to Phillips Petroleum Company, a corporation of Delaware
No Drawing. Filed Dec. 19, 1960, Ser. No. 76,483
9 Claims. (Cl. 260—94.3)

This invention relates to the production of rubbery polymers of conjugated dienes. In one aspect, the invention relates to an improved process for polymerizing conjugated dienes and to a novel catalyst therefor. In another aspect, the invention relates to an improved process for polymerizing conjugated diolefins containing from 4 to 8 carbon atoms so as to form rubbery polymers. In still another aspect, the invention relates to a process for polymerizing 1,3-butadiene so as to obtain a polybutadiene containing a high percentage of cis 1,4-addition.

In recent years there has been a great deal of activity in the development of processes for producing olefin polymers. Polymers of monoolefins, such as ethylene and propylene, prepared by these processes have received wide acceptance by many industries. The more recent discovery in the field of diene polymerization of certain so-called stereospecific catalysts, which make possible the formation of polymers having a desired configuration, has also aroused considerable interest. The polymers formed by the use of these catalysts often have outstanding physical properties which render them equal to or even superior to natural rubber. The present invention is concerned with the discovery of a catalyst system which makes it possible to produce polymers containing a high percentage of cis 1,4-addition.

It is an object of this invention to provide a novel process for polymerizing conjugated dienes to rubbery polymers.

Another object of the invention is to provide a novel catalyst system for use in the polymerization of conjugated dienes containing from 4 to 8, inclusive, carbon atoms per molecule.

A further object of the invention is to provide a process for producing a rubbery polymer of butadiene, which contains a high percentage of cis 1,4-addition.

A still further object of the invention is to provide a process for preparing a novel catalyst system.

Other and further objects and advantages of the invention will become apparent to those skilled in the art upon consideration of the accompanying disclosure.

It has been previously suggested that conjugated dienes can be polymerized in the presence of a catalyst system comprising an organoaluminum compound and a cobaltous or nickelous compound. When these catalyst components are contacted in a reaction zone with one another in the presence of a minor amount of a hydrocarbon diluent and aged prior to charging the bulk of the diluent and monomer to that zone, the results obtained are very erratic. Conversions are generally low, and the molecular weight of the products is undesirably high. If the catalyst is formed in dilute solution in the presence of a hydrocarbon diluent and monomer, semi-solid or even liquid products are produced. According to the present invention, there has now been discovered a method whereby the activity of the catalyst system comprising an organoaluminum compound and a cobaltous or nickelous compound can be greatly increased and the molecular weight of the diene polymer products can be controlled. Broadly speaking, the present invention resides in polymerizing a conjugated diene with a catalyst prepared by (1) contacting an organoaluminum compound with a cobaltous or nickelous compounds, (2) aging the resulting mixture, (3) incorporating as an adjuvant material a polymerizable compound selected from the group consisting of monoolefins and conjugated dienes into the aged mixture, (4) aging the resulting composition, and separating therefrom the solid material present in the composition. The remaining solution or liquid material has a greatly increased activity as a polymerization catalyst over a composition prepared in a similar manner but without the addition of the polymerizable compound.

In preparing the catalyst of this invention, the organoaluminum compound can be used per se or dissolved in a hydrocarbon diluent. The cobaltous or nickelous compound is then added as a solid. When the organoaluminum compound is used as a solution, the concentration can vary over a rather wide range, but it is generally no more dilute than 0.1 molar and is preferably in the range of 0.5 to 3 molars. After addition of the cobaltous or nickelous compound, the mixture in an initial aging step is aged for a period in the range of 1 minute to 25 hours or longer. The actual aging period is dependent upon the temperature employed, longer periods being used for lower temperature and shorter periods for higher temperatures. The temperature employed in the initial aging step is generally in the range of 0 to 80° C., preferably from 5 to 50° C. After the initial aging step, a polymerizable material is added to the aged mixture. The resulting composition is then again aged in a second aging step at a temperature in the range of 0 to 80° C. In this second aging step, the time is also dependent upon temperature and is generally at least 15 minutes. The time for the second aging step is preferably at least 1 hour and can range up to 50 hours and longer. When operating at about 80° C., a minimum aging time of about 15 minutes can be used while at 0° C. optimum results are obtained only after an extended aging period, e.g., 50 hours or longer.

The organoaluminum compounds used in the present catalyst system can be represented by the formula $R_3Al$, wherein R is an alkyl, aryl, alkaryl, aralkyl or cycloalkyl radical, preferably containing from 1 to 20, inclusive, carbon atoms. Examples of suitable compounds include trimethylaluminum, triethylaluminum triisopropylaluminum, triisobutylaluminum, tri-n-octylaluminum, triisooctylaluminum, tri-n-decylaluminum, tri-n-dodecylaluminum, tri-sec-eicosylaluminum, tribenzylaluminum, triphenylaluminum, trinaphthylaluminum, tri-p-tolylaluminum, tricyclohexylaluminum, tri(4-methylcyclohexyl)aluminum, tri(4-butylcyclohexyl)aluminum, tri(4-cyclohexylbutyl)aluminum, dimethylisopropylaluminum, n-heptyldiphenylaluminum, and the like. Examples of suitable cobaltous and nickelous compounds include the chloride, bromide, iodide, oxyhalides, cyanide, and thiocyanate. It is usually preferred to employ cobaltous compounds, particularly the cobaltous halides with cobaltous chloride being most frequently used.

Suitable polymerizable compounds which are added to the catalyst ingredients includes conjugated dienes containing from 4 to 8 carbon atoms per molecule and monoolefins containing from 2 to 9 carbon atoms per molecule. Examples of such compounds include 1,3-butadiene, 2-methyl-1,3-butadiene, (isoprene), 1,3-pentadiene, 2,3-dimethyl - 1,3 - butadiene, 2,3 - dimethyl - 1,3 - pentadiene, 2-methyl-3-ethyl-1,3-butadiene, 1,3-octadiene, ethylene, propylene, 1-butene, 1-hexene, 1-octene, cyclohexene, styrene, alpha-methylstyrene, and the like.

The amount of cobalt or nickel compound used in preparing the catalyst system is, on a molar basis, at least equal to the aluminum and can range from 1 to 25 mols per mol of aluminum compound. The preferred range is from 1 to 10 mols of cobalt or nickel compound per mol of aluminum compound. In order to obtain an active catalyst system, it is essential that at least a portion of the cobalt or nickel compound be in solution as a result of the reaction of the compound with the organoaluminum compound. The catalyst level employed in the polymerization can be conveniently expressed in terms of the aluminum since all of the aluminum compound used in preparing the catalyst is in solution. The amount of catalyst is generally in the range of 0.5 to 75, preferably from 2 to 40, gram millimoles of organoaluminum compound per 100 grams of monomer.

The amount of the adjuvant material used in preparing the catalyst is generally in the range of 0.1 to 15, preferably from 0.5 to 5, mols per mol of aluminum compound. A higher concentration of the cobalt or nickel compound in the soluble portion of the catalyst is made possible by use of the adjuvant. However, in the interest of obtaining high cis-content polymer products, it is desirable to keep the amount of adjuvant as low as possible without sacrificing the activity of the catalyst.

The monomeric material polymerized to produce rubbery polymers by the process of this invention comprises conjugated dienes containing from 4 to 8, inclusive, carbon atoms. Examples of conjugated dienes which can be used include 1,3-butadiene, 2-methyl-1,3-butadiene (isoprene), 2,3-dimethyl-1,3-butadiene, 2-methyl-1,3-pentadiene, chloroprene, 1-cyanobutadiene, 2,3-dimethyl-1,3-pentadiene, 2-methyl-3-ethyl-1,3-pentadiene, 2-methoxybutadiene, 2-phenylbutadiene, and the like. In a preferred embodiment, 1,3-butadiene is polymerized in the presence of the catalyst system of this invention to form a polybutadiene in which in excess of 90 percent of the polymer is formed by cis 1,4-addition of butadiene.

The invention is applicable to the polymerization of the above-defined conjugated dienes either alone or in admixture with each other and/or with one or more unsaturated compounds, preferably containing an active $CH_2=C$ group which are copolymerizable therewith. Included among these latter compounds are aliphatic 1-olefines having up to and including 8 carbon atoms per molecule, such as ethylene, propylene, 1-butene, 1-hexene, and 1-octene. Branched chain olefins, such as isobutylene, can be used as well as 1,1-dialkyl-substituted and 1,2-dialkyl-substituted ethylene such as 2-butene, 2-pentene, 2-hexene, 2-heptene, 2-methyl-1-butene, 2-methyl-1-hexene, 2-ethyl-1-heptene, and the like. Other olefins which can be used include di- and polyolefins, such as 1-5-hexadiene, 1,4-pentadiene, and 1,4,7-octatriene, and cyclic olefins, such as cyclohexene. Other examples of compounds containing an active $CH_2=C<$ group which are copolymerizable with one or more of the conjugated dienes are styrene, acrylonitrile, methacrylonitrile, methyl acrylate, methyl methacrylate, vinyl acetate, and the like.

The polymerization process of this invention is preferably carried out in the presence of a diluent. Diluents suitable for use in the process are hydrocarbons which are non-detrimental to the polymerization reaction. Suitable diluents include aromatics, such as benzene, toluene, xylene, ethylbenzene, and mixtures thereof. It is also within the scope of the invention to use aromatics in admixture with straight or branched chain paraffins or cycloparaffins as the diluent. Examples of paraffins which can be used include propane, normal butane, normal pentane, isopentane, normal hexane, isohexane, 2,2,4-trimethylpentane (isooctane), normal decane, and the like. Cycloparaffins which can be used in admixture with the aromatic hydrocarbons include cyclohexane, and methylcyclohexane. Furthermore, mixtures of various aromatics, either alone or in admixture with one or more paraffins or cycloparaffins, can be employed. When using a hydrocarbon mixture as the diluent, it is usually preferred that the mixture contain at least 10 weight percent of aromatics.

The polymerization process of this invention can be carried out at temperatures varying over a rather wide range, e.g., from $-100$ to $250°$ F. and higher. When it is desired to prepare polymers having a very high cis content, the lower temperatures, e.g. from $-30$ to $120°$ F., are usually employed. The polymerization can be carried out under autogenous pressure or at any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction.

The process of this invention can be carried out as a batch process by charging the monomer to a reactor containing the diluent and the catalyst prepared as hereinbefore described. The process can also be carried out continuously by charging the preformed catalyst and monomer to a reaction zone and by maintaining the concentration of the reactants as hereinbefore specified in the reaction zone for a suitable residence time. The residence time in a continuous process will, of course, vary within rather wide limits, depending upon such variables as temperature, pressure, and catalyst concentration. In a continuous process, the residence time will usually fall within the range of 1 second to 1 hour when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is usually desirable, therefore, that the butadiene be freed of these materials as well as other materials which may tend to inactivate the catalyst. Any of the known means for removing such contaminants can be used. Furthermore, the diluent employed in the process should be freed of impurities such as water, oxygen and the like. In this connection, it is desirable to remove air and moisture from the reaction vessel in which polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated is insufficient to cause complete deactivation of the catalyst.

Upon completion of the polymerization reaction, when a batch process is used, the total reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to the recovery of the polymer. After addition of the catalyst-inactivating material and the antioxidant, the polymer present in the solution can then be separated by the addition of an excess of a material, such as ethyl alcohol, or isopropyl alcohol. When the process is carried out continuously, the total effluent from the reactor can be pumped from the reactor to a catalyst-inactivating zone wherein the reactor effluent is contacted with a suitable catalyst-inactivating material, such as an alcohol. When an alcohol is used as the catalyst-inactivating material, it also functions to precipitate the polymer. In the event catalyst-inactivating materials are employed which do not perform this dual role, a suitable material, such as an alcohol, can then be added to precipitate the polymer. It is, of course, to be realized that it is within the scope of the invention to employ other suitable means to recover the polymer from solution. After separation from the water or alcohol and diluent by filtration or other suitable means, the polymer is then dried.

The present invention is concerned with the production of rubbery polymers of conjugated dienes. In an important aspect, the invention relates to the production of a polybutadiene having a high cis-content, e.g., from 85 to 98 percent and higher. The invention provides a process for obtaining high monomer conversions and for controlling the molecular weight of the product. The molecular weight is effected by the quantity of adjuvant, larger amounts giving lower molecular weight product. When operating within the limits specified hereinbefore, products ranging from soft to firm rubbers can be produced as desired. The catalyst aging period after addition of the adjuvant has an effect upon conversion, with longer aging periods generally giving higher conversions. An increase in catalyst level also acts to increase conversion. The polymers of this invention can be blended with other polymeric materials such as natural rubber, cis 1,4-polyisoprene, butadiene-styrene copolymers, polyethylene, and the like. In general, the polymers have utility in applications where natural and synthetic rubbers are used. They are particularly useful in the manufacture of automobile and truck tires and other rubbery articles, such as gaskets.

A more comprehensive understanding of the invention can be obtained by referring to the following illustrative examples which are not intended, however, to be unduly limitative of the invention.

Examples of certain of the polymer products produced in the runs described in the examples were examined by infrared analysis. This work was carried out in order to determine the percentage of the polymer formed by cis 1,4-addition, trans 1,4-addition and 1,2-addition of the butadiene. The procedure described hereinafter was employed in making these determinations.

The polymer samples were dissolved in carbon disulfide so as to form a solution having 25 grams polymer per liter of solution. The infrared spectrum of each of the solutions (percent transmission) were then determined in a commercial infrared spectrometer.

The percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2- (vinyl) determined according to the above procedures from the theoretical unsaturation, assuming one double bond per each $C_4$ unit in the polymer.

EXAMPLE I

A series of runs was conducted in which 1,3-butadiene was polymerized with a catalyst consisting of triethylaluminum and cobaltous chloride. Small amounts of butadiene or isoprene were used as adjuvant materials in preparing the catalyst composition. The following recipes were used in carrying out the runs:

*Recipes*

|  | A | B | C | D |
|---|---|---|---|---|
| 1,3-Butadiene (BD), parts by weight | 100 | 100 | 100 | 100 |
| Toluene, parts by weight | 1,200 | 1,200 | 1,200 | 1,200 |
| Triethylaluminum (TEA), mmoles | 10 | 10 | 10 | 5 |
| Cobaltous chloride (CoCl$_2$), mmoles | 20 | 20 | 10 | 10 |
| Butadiene in catalyst, mmoles | 0 | 120 | 10 | ------ |
| Isoprene in catalyst, mmoles | ------ | ------ | ------ | 10 |
| TEA/CoCl$_2$/diene in catalyst, mole ratio | 1/2/0 | 1/2/12 | 1/2/2 | 1/2/2 |
| Catalyst age at 30° C., hours | 17 | 17 | 17 | 17 |

In each run the following procedure was used in preparing the catalyst composition. Dry cobaltous chloride triethylaluminum in toluene was then added. This mixture of catalyst ingredients was aged for 10 minutes at room temperature after which either butadiene or isoprene was introduced. The resulting composition was then aged at 30° C. for a period of 17 hours. Run A as described in the recipe is a control run, the catalyst system containing no conjugated diene. After aging, the

TABLE I

| Run No. | Temp., degrees | Time, hrs. | Conv., percent | Inherent Viscosity [2] | Gel, percent [3] | ML-4 at 212° F.[4] | Microstructure, percent | | |
|---|---|---|---|---|---|---|---|---|---|
|  |  |  |  |  |  |  | Cis | Trans | Vinyl |
| A | 5 | 264 | 22 | 10.4 | 0 | ------ | 88.8 | 5.0 | 6.2 |
| B | 5 | 6 | 86 | 0.67 | 0 | ------ | 95.3 | 2.1 | 2.6 |
| C | 5 | 22.5 | 80 | 1.65 | ------ | 22.5 | 98.2 | 0.9 | 0.9 |
| D | 5 | 8.5 | 68 | 3.88 | ------ | ([1]) |  |  |  |

[1] Very high; not measured.
[2] One tenth gram of polymer was placed in a wire cage made from 80 mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage conating the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.
[4] ASTM D927–57T.

solid material was separated by placing the composition between the poles of a strong magnet. Aliquots of the clear liquid were withdrawn and employed to initiate the polymerization of 1,3-butadiene.

In carrying out the polymerization, toluene was charged first after which the reactor was purged with nitrogen. In Runs A and B, the concentrated, preformed catalyst was then introduced followed by the butadiene. In Runs C and D, the butadiene was charged to the reactor prior to introduction of the catalyst. The operating conditions as well as the results obtained in the runs are shown hereinabove in Table I. The dashes in Table I and in the succeeding tables indicate that the particular value was not determined.

The greater activity of the catalysts containing the conjugated diene adjuvants is clearly shown by comparing control Run A with Runs B, C and D. Run A gave only 22 percent conversion after 264 hours whereas in the other runs comparatively high conversions were obtained in only a few hours.

EXAMPLE II

A series of runs was conducted in order to show the effect of catalyst age and catalyst level on the polymerization of butadiene with a triethylaluminum-cobaltous chloride catalyst, utilizing butadiene or isoprene as an adjuvant material. The recipe employed in these runs was as follows:

*Recipe*

1,3-butadiene (BD), parts by weight _____ 100
Toluene, parts by weight _____ 1200
Triethylaluminum (TEA), mmoles _____ Variable
Cobaltous chloride ($CoCl_2$), mmoles _____ Variable
Butadiene or isoprene in catalyst, mmoles ____ Variable
TEA/$CoCl_2$/diene in catalyst, mole ratio _____ 1/2/1
Catalyst age at 30° C., hours _____ Variable
Temperature, ° C. _____ 5
Time, hours _____ Variable The procedure for preparing the catalyst as described in Example I was also used in this series of runs. In conducting the runs, the toluene was charged initially, and the reactor was then purged with nitrogen. The butadiene was then introduced after which the preformed catalyst was charged. The operating conditions and the results obtained in the runs are set forth hereinbelow in Table II.

in excess of one, preferably 10 hours or more, were found to be necessary under the conditions used in preparing the catalyst for these runs. Increasing the initiator level increases conversions as can be seen by comparing runs 5, 6 and 7; 9 and 10; 15, 16 and 17; and 19 and 20.

EXAMPLE III

A series of runs was carried out in which 1,3-butadiene was polymerized with a catalyst consisting of triethylaluminum and cobaltous chloride. Isoprene was employed as the adjuvant material in preparing the catalyst composition, and normal heptane was used as the diluent in the polymerizations. The runs were carried out in accordance with the following recipe:

*Recipe*

1,3-butadiene, parts by weight _____ 100
n-Heptane, parts by weight _____ 960
Triethylaluminum, mmoles _____ Variable
Cobaltous chloride, mmoles _____ Variable
Isoprene in catalyst, mmoles _____ Variable
TEA/$CoCl_2$/isoprene in catalyst, mole ratio ____ 1/2/1
Catalyst age at 30° C., hours _____ 26
Temperature, ° C. _____ 5
Time, hours _____ 26

The preformed catalyst was prepared as described hereinabove in Example I. In carrying out the runs, the normal heptane was charged initially after which the reactor was purged with nitrogen. The butadiene was then added followed by the preformed catalyst. The results of these runs are shown hereinafter in Table III.

TABLE III

| Run No. | TEA, Mmoles | $CoCl_2$, Mmoles | Isoprene in Catalyst, Mmoles | Conv., percent | Inherent Viscosity [1] | Nature of Product |
|---|---|---|---|---|---|---|
| 1 | 3.00 | 6.00 | 3.00 | 12 | 0.23 | Liquid. |
| 2 | 5.00 | 10.00 | 5.00 | 41 | ---- | Liquid. |
| 3 | 8.76 | 17.52 | 8.76 | 75 | 0.36 | Liquid. |

[1] See footnote (2) of Table I.

The data in Table III show that low molecular weight products are obtained when carrying out the process in the presence of an aliphatic diluent. It is noted that the catalyst was prepared in toluene so that some aromatic di-

TABLE II

| Run No. | TEA, Mmoles | $CoCl_2$, Mmoles | Adjuvant in Catalyst, Mmoles [1] | Catalyst Age, hrs. | Poly. Time, hrs. | Conv., percent | Inh.[2] Visc. | Microstructure, percent | | |
|---|---|---|---|---|---|---|---|---|---|---|
| | | | | | | | | Cis | Trans | Vinyl |
| 1 | 3 | 6 | 3 | 0.1 | 27.5 | 0 | ---- | ---- | ---- | ---- |
| 2 | 3 | 6 | 3 | 1 | 26.5 | 0 | ---- | ---- | ---- | ---- |
| 3 | 3 | 6 | 3 | 3 | 24.5 | 12 | 0.90 | ---- | ---- | ---- |
| 4 | 3 | 6 | 3 | 5 | 22.5 | 8 | 0.88 | ---- | ---- | ---- |
| 5 | 2 | 4 | 2 | 11 | 16.5 | 7 | 1.45 | ---- | ---- | ---- |
| 6 | 3 | 6 | 3 | 11 | 16.5 | 15 | 1.92 | 95.7 | 2.0 | 2.3 |
| 7 | 5 | 10 | 5 | 11 | 16.5 | 33 | 1.81 | 95.7 | 2.0 | 2.3 |
| 8 | 3 | 6 | 3 | 20 | 7.5 | 13 | 4.15 | ---- | ---- | ---- |
| 9 | 3 | 6 | 3 | 26 | 1.5 | 40 | 4.07 | 98.1 | 1.0 | 0.9 |
| 10 | 5 | 10 | 5 | 26 | 1.5 | 66 | 4.58 | 97.7 | 1.4 | 0.9 |
| 11 | 3 | 6 | 3 | 0.1 | 26.5 | 0 | ---- | ---- | ---- | ---- |
| 12 | 3 | 6 | 3 | 1 | 25.5 | trace | ---- | ---- | ---- | ---- |
| 13 | 3 | 6 | 3 | 3 | 23.5 | 3 | 0.68 | ---- | ---- | ---- |
| 14 | 3 | 6 | 3 | 5 | 21.5 | 3 | 0.56 | ---- | ---- | ---- |
| 15 | 2 | 4 | 2 | 11 | 15.5 | 17 | 2.46 | 97.1 | 1.4 | 1.5 |
| 16 | 3 | 6 | 3 | 11 | 15.5 | 46 | 2.74 | 96.9 | 1.6 | 1.5 |
| 17 | 5 | 10 | 5 | 11 | 15.5 | 75 | 3.09 | 97.7 | 1.1 | 1.2 |
| 18 | 3 | 6 | 3 | 20 | 6.5 | 61 | 4.76 | 98.1 | 1.0 | 0.9 |
| 19 | 3 | 6 | 3 | 26 | 1.5 | 59 | 3.09 | 97.3 | 1.4 | 1.3 |
| 20 | 5 | 10 | 5 | 26 | 1.5 | 87 | 3.28 | 97.3 | 1.5 | 1.2 |

[1] Butadiene used in runs 1 to 10; isoprene used in runs 11 to 20.
[2] See footnote (2) of Table I.

These results show that the initiator aging period has a pronounced effect on conversion, higher conversions being obtained with longer aging periods. Aging periods luent was included in the reaction mixture of each run. The data also demonstrate the conversion is increased by increasing the catalyst level.

EXAMPLE IV

Another series of runs was carried out in which 1,3-butadiene was polymerized with a catalyst consisting of triethylaluminum and cobaltous chloride. In these runs, styrene and alpha-methylstyrene were employed as adjuvant materials in preparing the catalyst composition. The following recipe was employed in these runs:

Recipe

| | |
|---|---|
| 1,3-butadient, parts by weight | 100 |
| Toluene, parts by weight | 1200 |
| Triethylaluminum, mmoles | Variable |
| Cobaltous chloride, mmoles | Variable |
| Catalyst adjuvant (styrene or alpha-methylstyrene), mmoles | Variable |
| TEA/CoCl$_2$/Adjuvant, mole ratio | 1/2/1 |
| Catalyst age at 30° C., hours | 18 |
| Temperature, ° C. | 5 |
| Time, hours | 47.5 |

The preformed catalyst was prepared as described hereinabove in Example I except that styrene and alpha-methylstyrene were used as the catalyst adjuvants. In carrying out the runs, toluene was initially charged to the reactor which was then purged with nitrogen. Butadiene was then added after which the preformed catalyst was charged. The results obtained in these runs are shown hereinafter in Table IV.

TABLE IV

| Run No. | TEA, Mmoles | CoCl$_2$, Mmoles | Styrene in Initiator, Mmoles | Alpha-methyl-styrene in Initiator, Mmoles | Conv., percent | Inh.[1] Visc. | Gel., percent | Microstructure, percent | | |
|---|---|---|---|---|---|---|---|---|---|---|
| | | | | | | | | Cis | Trans | Vinyl |
| 1 | 10 | 20 | 10 | | 21 | 2.31 | 0 | 96.0 | 1.8 | 2.2 |
| 2 | 5 | 10 | 5 | | 8 | 1.75 | 0 | | | |
| 3 | 10 | 20 | | 10 | 67 | 3.51 | 0 | 97.1 | 1.6 | 1.3 |
| 4 | 5 | 10 | | 5 | 35 | 2.70 | 0 | 96.5 | 1.7 | 1.8 |

[1] See footnote (²) of Table I.

A comparison of the runs of Table IV with control run A of Example I shows that the products have a much lower inherent viscosity than the product of the control. The data of Table IV also demonstrate the catalysts containing the adjuvant materials are more active than a catalyst which does not contain these materials as was used in the control run.

EXAMPLE V

A run is carried out in which isoprene is polymerized with a catalyst consisting of triisobutylaluminum and nickelous chloride. A small amount of 1,3-butadiene is used as the adjuvant material in preparing the catalyst. The following recipe is used in this run:

Recipe

| | |
|---|---|
| Isoprene, parts by weight | 100 |
| Toluene, parts by weight | 1200 |
| Triisobutylaluminum, mmoles | 5 |
| Nickelous chloride, mmoles | 10 |
| 1,3-butadiene in catalyst, mmoles | 5 |
| Catalyst age at 30° C., hours | 26 |
| Polymerization temperature, ° C. | 5 |
| Polymerization time, hours | 40 |

The procedure described in Example I is used in preparing the catalyst for this run. In carrying out the run, the toluene is charged initially, and the reactor is then purged with nitrogen. The isoprene is then introduced after which the preformed catalyst is charged. At the end of the reaction period, a high cis-polyisoprene is recovered as the product of the run.

As will be evident to those skilled in the art, many variations and modifications of this invention can be practiced in view of the foregoing disclosure. Such variations and modifications are believed to come within the spirit and scope of the invention.

We claim:

1. A process for polymerizing a conjugated diene containing from 4 to 8, inclusive, carbon atoms which comprises mixing a metal compound selected from the group consisting of cobaltous and nickelous halides with an organoaluminum compound having the formula R$_3$Al, wherein R is selected from the group consisting of alkyl, aryl, alkaryl, aralkyl and cycloalkyl radicals; aging the resulting mixture; adding to said aged mixture an adjuvant selected from the group consisting of monoolefins containing from 2 to 9 carbon atoms per molecule and conjugated dienes containing from 4 to 8 carbon atoms per molecule; aging the resulting composition; separating solid material from the aged composition; and contacting under polymerization conditions a monomeric material comprising a conjugated diene containing from 4 to 8, inclusive, carbon atoms with solution remaining after separation of said solid material.

2. The process according to claim 1 in which said metal compound is cobaltous chloride, said R$_3$Al compound is triethylaluminum, and said adjuvant is 1,3-butadiene.

3. The process according to claim 1 in which said metal compound is cobaltous chloride, said R$_3$Al compound is triethylaluminum, and said adjuvant is isoprene.

4. The process according to claim 1 in which said metal compound is cobaltous chloride, said R$_3$Al compound is triethylaluminum, and said adjuvant is styrene.

5. The process according to claim 1 in which said metal compound is cobaltous chloride, said R$_3$Al compound is triisobutylaluminum, and said adjuvant is 1,3-butadiene.

6. The process according to claim 1 in which said metal compound is nickelous chloride, said R$_3$Al compound is triethylaluminum, and said adjuvant is 1,3-butadiene.

7. A process for polymerizing a conjugated diene containing from 4 to 8, inclusive, carbon atoms which comprises mixing a metal compound selected from the group consisting of cobaltous and nickelous halides with an organoaluminum compound having the formula R$_3$Al, wherein R is selected from the group consisting of alkyl, aryl, arkaryl, aralkyl and cycloalkyl radicals, the amount of said metal halide being in the range of 1 to 25 mols per mol of an R$_3$Al compound, and said R$_3$Al compound being in solution in a liquid hydrocarbon; aging the resulting mixture at a temperature in the range of 0 to 80° C. for a period in the range of 1 minute to 25 hours; adding to said aged mixture an adjuvant selected from the group consisting of monoolefins containing from 2 to 9, inclusive, carbon atoms per molecule and conjugated dienes containing from 4 to 8, inclusive, carbon atoms per molecule, the amount of said adjuvant being in the range of 0.1 to 15 mols per mol of said R$_3$Al compound; aging the resulting composition at a temperature in the range of 0 to 80° C. for a period in the range of 15 minutes to 50 hours; separating solid material from the aged composition; contacting a monomeric material comprising a conjugated diene containing from 4 to 8, inclusive, carbon atoms with solution remaining after separation of said solid material, said contacting occurring at a temperature in the range of −30 to 175° F. and under autogenous pressure; and recovering the polymer so produced.

8. A process according to claim 7 in which said monomeric material comprises 1,3-butadiene.

9. A process according to claim 7 in which said monomeric material comprises isoprene.

References Cited by the Examiner

UNITED STATES PATENTS

| | | | |
|---|---|---|---|
| 2,936,302 | 5/60 | Jones et al. | 260—94.2 |
| 2,953,556 | 9/60 | Wolfe | 260—94.7 |
| 2,962,488 | 11/60 | Horne | 260—94.7 |
| 2,977,349 | 3/61 | Brockway | 260—94.3 |
| 3,135,725 | 6/64 | Carlson et al. | 260—94.3 |

FOREIGN PATENTS

| | | |
|---|---|---|
| 218,210 | 11/58 | Australia. |
| 538,782 | 12/55 | Belgium. |
| 827,365 | 2/60 | Great Britain. |
| 526,101 | 11/55 | Italy. |

OTHER REFERENCES

Gaylord et al., "Linear and Stereoregular Addition Polymers," pp. 154–155, Interscience Publishers, Inc., New York, 1959.

JOSEPH L. SCHOFER, *Primary Examiner.*

MORRIS LIEBMAN, LEWIS GOTTS, *Examiners.*

UNITED STATES PATENT OFFICE
CERTIFICATE OF CORRECTION

Patent No. 3,215,682 November 2, 1965

Ralph C. Farrar et al.

It is hereby certified that error appears in the above numbered patent requiring correction and that the said Letters Patent should read as corrected below.

Column 10, line 53, for "arkaryl" read -- alkaryl --.

Signed and sealed this 28th day of June 1966.

(SEAL)
Attest:

ERNEST W. SWIDER
Attesting Officer

EDWARD J. BRENNER
Commissioner of Patents